W. Biddle,
Cage Trap,
N° 1,238. Patented July 12, 1839.
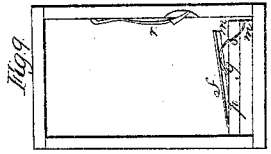
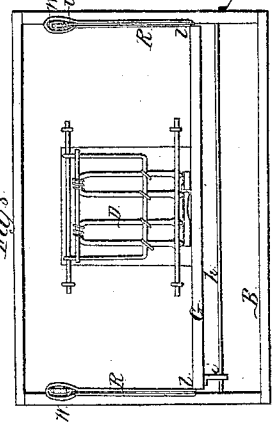
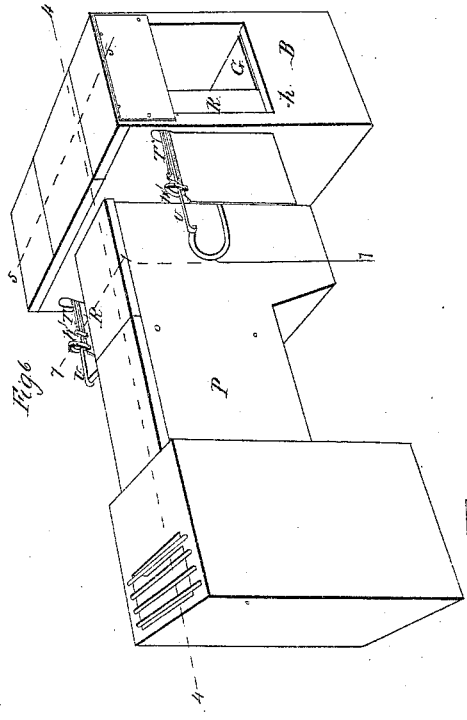
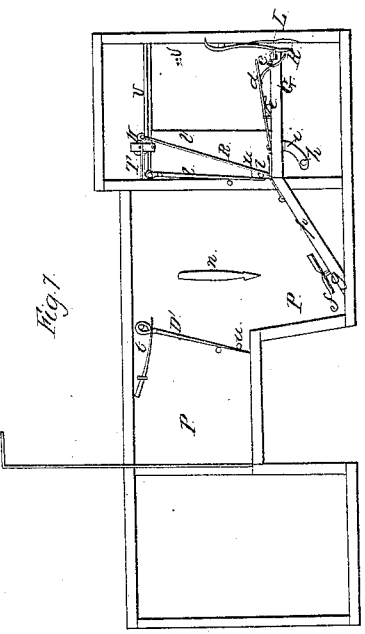

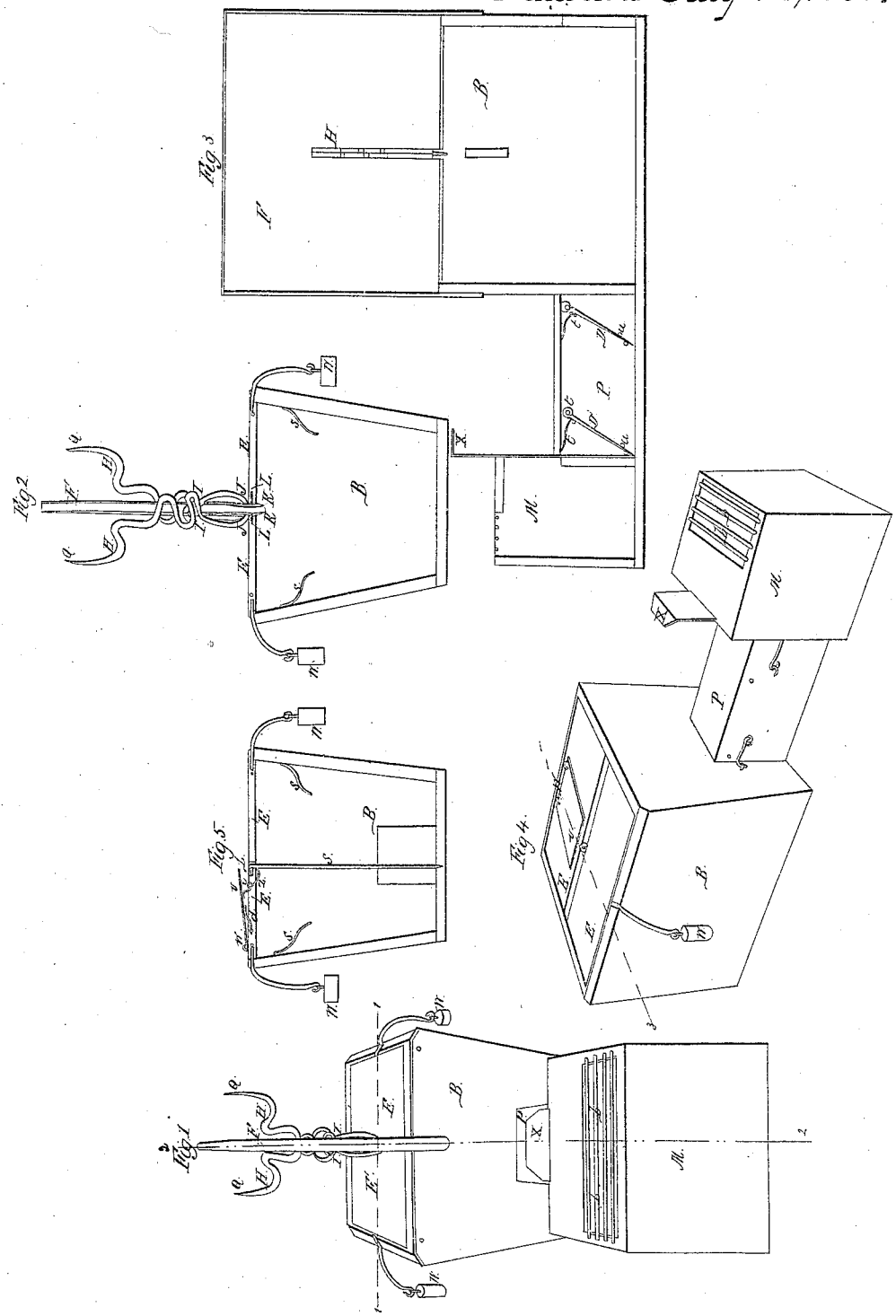

UNITED STATES PATENT OFFICE.

WM. BIDDLE, OF PITTSBURGH, PENNSYLVANIA.

TRAP FOR CATCHING ANIMALS.

Specification of Letters Patent No. 1,238, dated July 12, 1839.

*To all whom it may concern:*

Be it known that I, WILLIAM BIDDLE, of Pittsburgh, in the county of Allegheny and State of Pennsylvania, have invented a new and Improved Mode of Constructing Animal Traps, which is described as follows, reference being had to the annexed drawings of the same, making part of this specification.

The nature of my invention consists in constructing my traps to suit the habits and characters of animals to be caught—in so constituting a self adjustment of the traps as that they will immediately, on the taking of an animal, reset themselves, or be by the prisoners reset in such a mode as, on the other hand, not to alarm the cautious, and on the other hand, to take advantage of the stupid, in providing a passage which shall only be used as a passage, which, when once passed, cannot be reëntered and which leads to a room easily detached from the trap or in the stead of which another room may easily be placed and in the impossibility of the animal doing more than touching the bait, so that as soon as he is captured the trap is restored to a perfect state of preparation for another visitor and would, in the same manner, continue to maintain such a condition until time had destroyed the bait.

To enable others skilled in the art to make and use my invention I will proceed to describe its construction and operation.—

The form of my trap may be varied so as to accommodate the different characters of animals.

Figure 1 is a perspective view of a form of trap set and suited for catching very rapacious and cunning animals, as, for instance the rat, the fox, or the bear, having the bait outside and above the trap, and also representing the apartment into which the animals are received as fast as caught. Fig. 2 is a transverse section of ditto at the line 1, 1, of Fig. 1. Fig. 3 is a longitudinal section of ditto at the line 2, 2, of Fig. 1. Fig. 4 is a perspective view of the trap as set for catching wolves, &c. Fig. 5 is a transverse section of ditto at the line 3, 3, of Fig. 4. Fig. 6 is a perspective view of a form of trap set for catching animals that inhabit the banks and frequent the waters of rivers, such as the musk rat or the beaver, and also representing the apartment into which they are received after being caught. Fig. 7 is a longitudinal section of ditto at the line 4, 4, of Fig. 6. Fig. 8 is a transverse section of ditto at the line 5, 5, of Fig. 6. Fig. 9 is a transverse section of ditto at the line 7, 7, of Fig. 6.

Similar letters of reference in the several figures refer to similar parts.

The first mentioned form of trap represented at Fig. 1 consists of a box (B) having a passage P which leads to a second box M. The passage is guarded at either end by a wire drop vale D′ or D, which opens inward, or toward the receiver M. It is hinged on the upper side, on which a spring ($t$) presses for keeping it down upon a transverse cross wire ($u$) passing through the sides of the passage for preventing the animal raising the valve from the side toward the receiver. The spring is fastened at one end to the side of the apartment.

The trap E has a lid or trap door opening downward. It is nearly balanced by a counterweight W. Of these lids there are two E′ E separated by the perpendicular wooden plane F. This plane carries or sustains the trigger H. The trigger is a bent wire H. It presses on or against a spring catch K, Fig. 2. Beneath the trap lid is a spring $s$ which is riveted to the inside of the box B immediately below the lid, against which it strikes in its descent and acts so as to assist in throwing the lid upward to its horizontal position. No sooner does the animal seize the bait (which is suspended on the point of the trigger H at Q) than the trigger, which turns upon a pivot I, presses at the point J, upon or against the spring catch K, and pushes it back from under the lid, or from beneath a latch L secured to the lid, when the whole—that is the side of the lid and the animal or animals thereon—are precipitated to the bottom of the box, in the manner of a drop, by the weight of the animals. The action of the spring $s$ and the counter weight W instantly restores the trap lid E to a horizontal position, having the appearance of a solid platform, as represented in Fig. 1, at E. The light admitted through the spaces between the bars $b$ of the receiver M induces the captured animal through the passage P into his appointed prison or receiver M, while the wire drop valves D′ D prevent his return and thus keep the passage clear for the next visitor. When the receiver or prison M is full of animals a slide $x$ must be dropped over the door or entrance to prevent their escape when this receiver is required to be removed or separated from the passage of the trap for the destruction of the animals or for the substitution of another similar receiver which is empty.

When this trap is to be used for catching wolves, &c., the vertical plane (F) to which the spring catches K and bent triggers H are attached must be removed and the drop-platform E', Fig. 5, set by means of an upright spring catch $y$ erected in the center of the trap-box B and which is disengaged so as to let the platform fall by means of a trigger $z$ turning on a pivot in an oblong mortise in the platform E, one end of the trigger being below the platform E and touching the spring catch $y$ and the other end above the platform and under a second and smaller platform $v$ hung by hinges or hooks and eyes $w$ to the large platform E' and held up from the trigger by a spring $a$ fastened to the trap platform E', so that when the animal passes on to the platform E' he advances in apparent security until he arrives upon the small platform $v$ on the top of the large one E', when the small one $v$ descends, contracts the spring $a$, depresses one end of the trigger $z$ and raises the other end, which pushes the upright spring catch $y$ from under the drop platform E', when suddenly it falls, the animal being precipitated into the box below, the counter weight W and spring $s$ instantly restoring the platform to its original horizontal position completely set for another animal, which is served in like manner, and so on until the receiver M is full, when it is secured and removed, as before described.

The trigger H, as seen in Figs. 1 and 2, may be curved in the manner represented in the drawings, so that it shall form an aperture about one third its length from the lower end to receive a pin or fulcrum I, on which it moves, and bent inward or toward the vertical plane F in such a manner that it shall strike against the side of the spring catch K without meeting any obstruction and act upon it with precision in the operation of disengaging it from the latch L of the drop platform E', the upper end of said trigger being also bent inward in the form of a bill-hook for holding the bait securely. This trigger, however, may be curved in any form to suit the views of the maker.

The second form of trap, Fig. 6, for taking animals that inhabit the banks and frequent the waters of rivers—for instance the muskrat, &c.—has horizontally sliding doors, which, when open, leave the trap in the form of an animal's run. It may be placed partly in the water. The slide doors are marked (R) and may be made throughout of metal. The drop marked (G) is sustained by a spring catch K, Fig. 1, which comes under the hasp L, that is driven firmly into the edge of the drop (G). The trigger marked $c$ is made and operates in a similar manner to that before described marked ($z$), which is pressed down by an additional and smaller drop $d$, which is hinged to the upper side of the main drop G and which is thrown up by a spring ($e$) in like manner. The hinge on which the drop platform is hung consists of a horizontal rod $h$ passing longitudinally through the ends of the box B and through round apertures made in the ends of curved arms $i\ i$ screwed or otherwise permanently fastened to the underside of the drop G and projecting downward therefrom. From the rear edge of this drop platform or that where the hinges are placed there projects downward at an obtuse angle a narrow platform $p$, which fills the breadth of the passage P and works therein. It extends down as far as the bottom of the box and has the position represented in the drawing at Fig. 7 when the trap is set and it will assume a horizontal position when the main drop platform G is depressed by the entrance of an animal into the trap, which presses down the trap lid G, contracts the spring $e$, moves the trigger $c$ and forms the spring-catch K from the hasp L, when the weight of the animal, together with that of the lid, will act with velocity against the counteracting weight of the narrow platform $p$ in the passage, which platform is also furnished with a movable drop $f$ hinged to its upper side and a spring $g$ and trigger $m$ under it for the purpose of disengaging the said narrow platform from a spring catch $n$ in the passage P, which holds it up in a horizontal position until an animal on his way through the passage to the receiver steps upon the hinged lid $f$. These parts just mentioned—viz., the drop $f$, spring $g$ and trigger $m$—are made, arranged, and operated in a similar manner to those on the platform G before described.

In order to close the horizontal slides or doors R, as soon as the animals disengage the catch by the trigger and the drop G falls, an arm $l$ is attached to the trap lid or drop by screws, staples or otherwise, to the upper end of which arm a horizontal rod T is attached by a loose joint, leading thence horizontally to the upper edge of the sliding door R, to which it is attached by another loose joint. The sliding door is suspended upon a horizontal way or round bar V passing through the trap and extending beyond it far enough for the slide to run back upon. The suspension is from the axles of grooved wheels W' turning upon said way to reduce the friction that would be created by the slide moving in grooves against the sides thereof and is effected by means of traps or straps attached to the upper edge of the sliding door and then to the axles of the wheels which they embrace. When the drop or platform falls the crank $l$ fastened permanently thereto moves with it so that ($l'$), its primary arm, which in the open condition of the trap is perpendicular, changes its position to an angle determined by the degree of fall allowed to G and which must be so graduated as that the consequent motion of the arm ($l'$) will be just sufficient to close the sliding door.

Between the main drop or trap and the receiver or prison there are two inclined wire drop valves D D, such as those used in other traps; but they are furnished with springs $t$ in a similar manner to those described in the first mentioned trap for preventing the animals opening them to return, and said valves also drop against cross bars or wires $u$ in like manner.

The bait in this trap is put upon a hook or point ($o$ $o$) inserted in the end of the trap inside immediately over the spring catch. The other end of the trap is furnished with a sliding door, arm, rod, way, wheels, &c., similar to those just described.

When the animal enters the trap and approaches the bait $o$ $o$ he necessarily has to pass upon the falling lid $d$, which descends, contracts the spring $e$, moves the trigger $c$ and disengages the spring catch K, when down falls the drop G with the animal upon it, which is precipitated to the lower side of the trap-box B and at the same closes himself in by means of the cranks $l$ attached to the drop G, changing their positions from a perpendicular to an angle of 45°, or any other degree necessary to close the slides R, which is done by the arms T attached to them and to the cranks $l$, the position of the slides being reduced by the grooved rollers or wheels W' turning upon the ways V. The animal then perceiving a light at the farther extremity of the passage or lateral trunk P makes for it, first raising and passing the first wire drop valve D, then treads upon the drop lid $f$ of the narrow platform $p$, which disengages it from the spring catch $n$, and down it falls, at the same time raising the main trap fall to a horizontal position and the arms to a vertical position and thus opening the sliding doors again and resetting the trap for another visitor. The animal already caught and on the narrow platform still moves toward the light entering through the grating of the prison or receiver and raises the second wire drop valve D, which, as soon as he has passed it, is driven down by its gravity and the spring $t$ above and thus he is prevented from returning, and then he enters the prison, where he is secured by a vertical slide $x$ pushed down over the entrance. The receiver is then removed, another put in its place, or this is discharged of its contents and restored to its former position ready for the entrance of another animal.

The invention claimed and desired to be secured by Letters Patent consists—

1. In the combination and arrangement of the curved triggers and spring catches attached to the vertical plane so as to suspend the bait above the trap door in order to remove suspicion as herein described.

2. The arrangement of the upright spring catch $y$, horizontal trigger $z$, and falling lid $v$, in combination with the trap door E as before described.

3. The arrangement of the spring and counter weight in combination with the trap door E as described.

4. The combination of the trap lid or drop G, arms $l$, rods T and sliding doors R, for the purpose and in the manner herein described, and also the combination of the trap lid or drop G with the platform $p$ for the purpose and in the manner described.

WM. BIDDLE.

Witnesses:
 WM. P. ELLIOT,
 ED MAHER.